Figure 1:
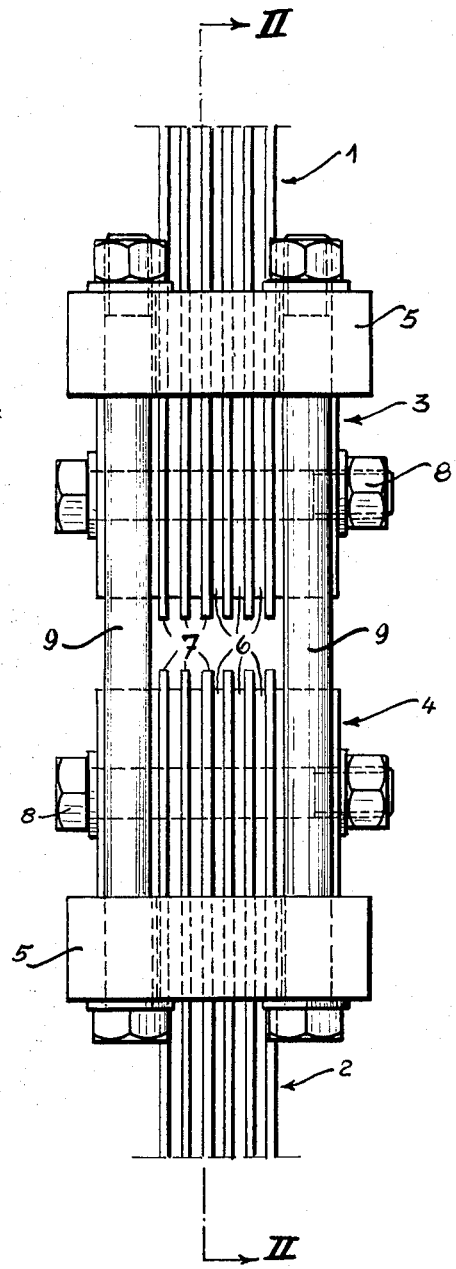

INVENTORS
Ludwig Muehe
Ernst-August Rose

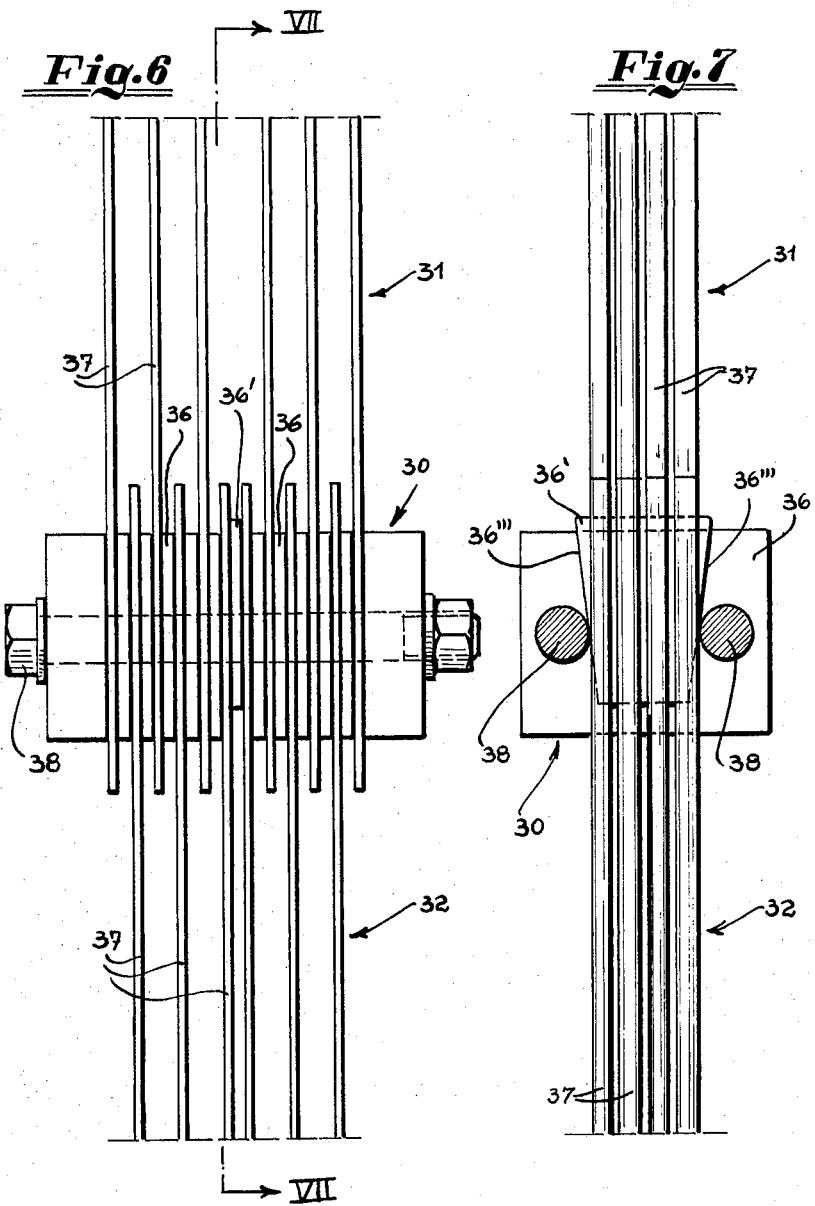

United States Patent Office 3,249,374
Patented May 3, 1966

3,249,374
APPARATUS FOR COUPLING TOGETHER TWO BUNDLES OF STRESSING WIRES FOR STRESSING CONCRETE
Ludwig Muehe, Oberursel, Taunus, and Ernst-August Rose, Hanover, Germany, assignors to Philipp Holzmann Aktiengesellschaft, Frankfurt am Main, Germany
Filed Apr. 8, 1965, Ser. No. 449,366
Claims priority, application Germany, June 18, 1959, H 36,683
8 Claims. (Cl. 287—76)

This is a continuation-in-part of application Serial No. 36,231, filed June 15, 1960, and now abandoned.

This invention relates to an apparatus for coupling together two bundles of stressing wires for stressing concrete.

For the production of reinforced concrete structures the coupling of the ends of two bundles of stressing wires is often necessary because the length of the wires does not comply with the requirements of the structure. The basic problem in coupling two bundles of stressing wires is to provide a reliable connection of a great number of wires which connection will only require a minimum of space. The heretofore known coupling devices have the disadvantage of coupling only a comparativley small number of wires. Moreover they are not sufficiently reliable for high grade wires because failure of the coupling will occur before the maximum tension load of such high grade wires is reached.

It is an object of the present invention to provide an apparatus for coupling together two bundles of stressing wires in a reliable manner without limiting the number of wires in the bundles.

It is a further object of the invention to provide a coupling for two bundles of stressing wires which only requires a minimum of space.

Another object of the invention is to provide a coupling for two bundles of high grade stressing wires which is reliable under tension loads up to the breaking load of the wires.

In anchoring the ends of stressing wires against the face of a concrete structure it has heretofore been proposed to assemble the stressing wires as several parallel layers separated from each other by plates and to interpose the assembly between two plates which are urged towards each other by bracing between nuts on threaded bolts which run through bores in the plates. Especially a structure has been devised wherein layers of two wires are clamped between a number of plates which are urged towards each other by three bolts arranged in a row parallel to the general direction of the wires.

However, the problem of coupling together the ends of two bundles of stressing wires is different from that of anchoring the ends of one bundle of stressing wires against the face of a concrete structure, because in coupling two bundles no concrete structure is available to support the clamping plates. Moreover the proposed anchoring device has a serious disadvantage in that failure will occur under high tension loads. Even a greater number of bolts and/or larger cross section thereof can not overcome this drawback.

The reason for this failure of the known device is that under high tension load the cross section of each single wire will decrease. As a consequence the wires are no more tightly gripped between the plates so that slippage of the wires occurs, causing the immediate failure of the anchoring device.

It is therefore an important object of the present invention to provide an apparatus for coupling together two bundles of stressing wires, wherein layers or rows respectively of stressing wires of both bundles are clamped between parallel plates in a novel and reliable manner by which failure of the clamping effect under high tension load is avoided so that even high grade wires may be strained to the utmost limit of their capacity for tension load without slippage upon decrease in wire cross section.

According to one aspect of the present invention there is provided an apparatus for coupling stressing wire bundles, comprising, in combination, a first and a second substantially aligned bundle of parallel stressing wire, each bundle including a plurality of substantially parallel rows of wires, the ends of said wires in the first bundle being adjacent the ends of said wires in the second bundle, first means including a plurality of plate portions positioned substantially parallel between said rows of wires so that said wires extend parallel to the major faces of said plate portions, block means substantially parallel to the plate portions and outwardly thereof, and second means adjacent said wire ends for exerting compressive forces to said block means in a direction perpendicular to said faces, for clamping said wires between said plate portions and for connecting said first and second bundles for stress transmission between said first and said second bundle, said second means comprising high tensile bolts arranged in a single plane normal to the common direction of the wires in each bundle and prestressed for elastic elongation, whereby decreasing cross section of the wires due to high tensile load is compensated by elastic contraction of said bolts without loss of clamping force.

It is a special advantage of the invention that connection of the two bundles can be achieved in a space saving manner by interconnecting or even integrally connecting the block means of both bundles. Moreover the invention may be applied to the coupling of two bundles of wires wherein the cross section of the wires of one of the bundles is different from that of the wires of the other bundle.

According to one special aspect of the invention stressing wires of oblong cross section, f.i., of oval or of rounded rectangular cross section, with its longer axis extending substantially parallel to the major faces of the clamping plates, may be provided, whereby the contact faces of wires and plates are increased. According to a preferred embodiment rib-like projections may be provided on the surfaces of the wires or on the major faces of the clamping plates to improve the frictional engagement between the wires and the plates.

Figure 2:
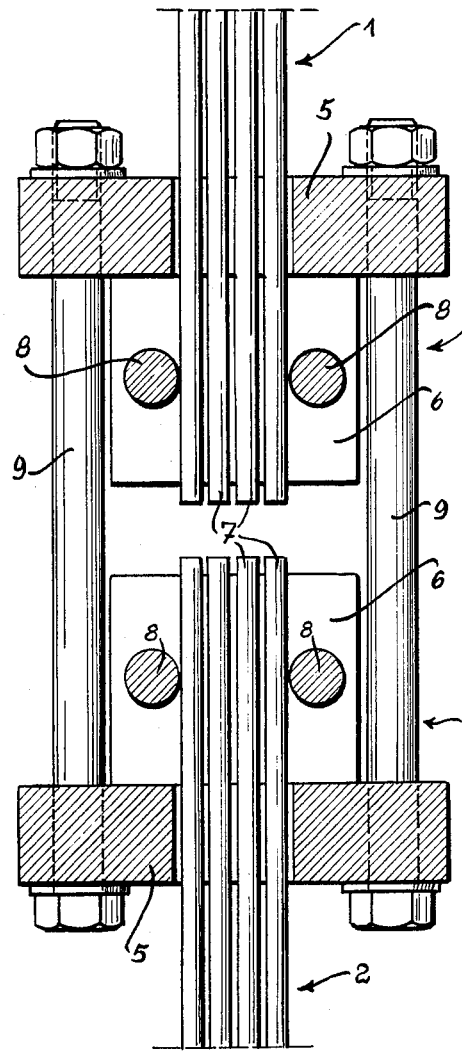
Figure 8:
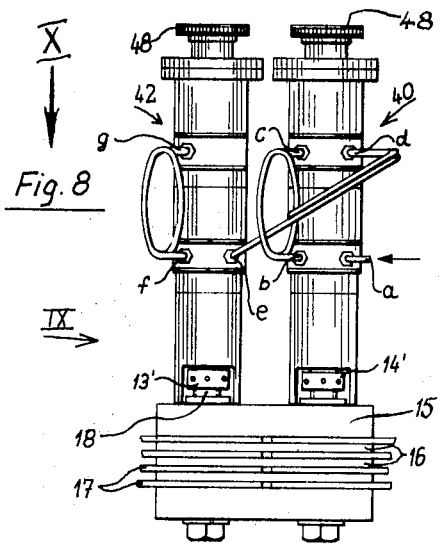
Figure 9:
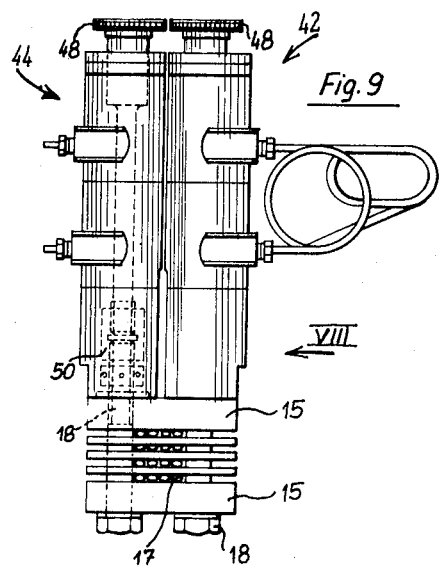
Figure 10:
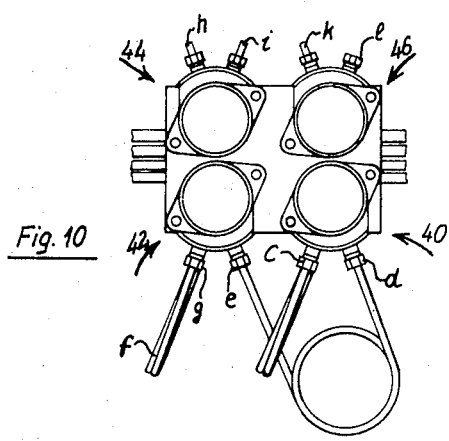
Figure 15:
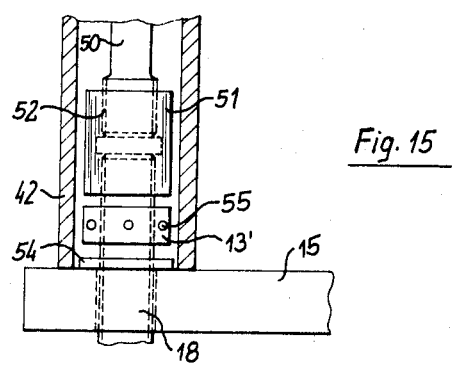
Figure 11:
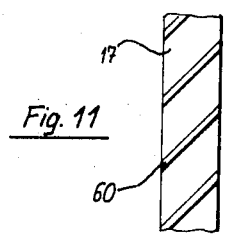
Figures 13, 14:
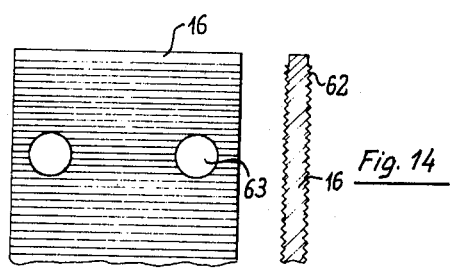
Figure 12:

The above and other objects and advantages of the invention will become apparent upon consideration of the following description of several preferred embodiments and the accompanying drawing:

In the drawing:

FIGURES 1 and 3 to 6 show longitudinal sections through or side elevations of five different coupling devices respectively, FIGURES 2 and 7 show sections taken along the lines II—II and VII—VII of FIGURES 1 and 6, respectively, FIGURES 8, 9 and 10 show elevational, side and top views respectively of a hydraulic device for simultaneously prestressing the bolts of a coupling and for tightening the nuts thereafter, FIGURES 11 and 12 show an elevational and a cross sectional view of a preferred type of stressing wire, FIGURES 13 and 14 show an elevational and a cross sectional view of a clamping plate, which may advantageously be used for clamping wires with smooth surfaces, and FIGURE 15 is an enlarged, partly sectional view of the lower portion of one of the cylinders of the hydraulic device shown in FIG. 8 through 10.

The illustrated examples are concerned with coupling together two bundles of wires, each having six rows of wires with four wires in each row, the wires being intended for prestressing a concrete beam.

Referring to the embodiment according to FIGURES 1 and 2 where the bundles of wires are referenced 1 and 2, there are shown two wire-clamping packages 3, 4, each comprising a number of plane, parallel, comparatively thin clamping plates 6 and block means consisting of two comparatively thick plate-like blocks (referenced 15 in FIG. 3) outwardly and on opposite sides of the plates 6 with two clamping bolts 8 inserted in aligned holes provided in the plates 6 and the blocks 15. The wire ends 7 are inserted between the clamping plates 6 of the two packages 3, 4 so that between each pair of adjacent plates there are all the wires of one row. An oblong block 5, formed with four bolt holes therethrough near the corners and with a central hole through which the wires pass, is positioned at the outer front side of each package and fixing bolts 9 pass through the aforementioned bolt holes to hold the two blocks 5 together. Before tightening the nuts on the bolts 8 the bolts 8 are prestressed to an extent where elastic elongation of the bolts is reached, with the bolts being made of high grade steel. It is to be noted that, different from the heretofore used normal bolts, the desired clamping force for the stressing wires in each package is obtained by high grade bolts under high axial tensile load. Therefore any reduction in cross section of the stressed wires will be compensated by corresponding elastic axial contraction of the bolts 8, thus maintaining the wires 7 in reliable clamping connection with the plates 6.

That edge of each plate 6, which is further from the plates of the other clamping device, bears against the associated block 5 and thus transmits a portion of the tensile forces exerted upon that plate. The tensile forces are transmitted from one block 5 to the other only by means of the four screw-threaded bolts 9, interconnecting blocks 5 and thereby also block means 15 of the two bundles.

To make the illustrated assembly, all the wires 7 of a bundle are cut to the same length at one end. Then, at each bundle end, the wire ends 7 are inserted between the clamping plates 6 which are then compressed by prestressing the bolts 8 and thereafter tightening the nuts on the bolts. The two packages 3, 4 are then connected by means of the blocks 5 and the four bolts 9.

FIGURES 1 and 2 show two bundles of wires of identical construction. However, it is easily possible, with a coupling device basically like that of FIGURES 1 and 2, to couple together bundles of prestressing wires of different constructions and/or cross sections. It is then merely necessary to provide for each bundle an appropriately constructed clamped package, ensuring that the bolt holes in the associated blocks 5 are of the same size in the two blocks and that they are aligned so as to be secured together by the bolts 9. This variant is not illustrated.

Figure 3:
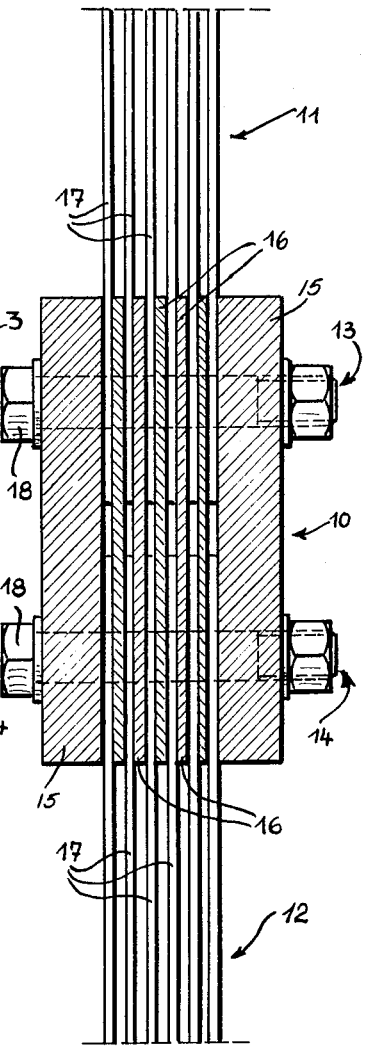

In the embodiment according to FIGURE 3, there is a coupling device 10 which consists of only two side blocks 15, extending along the wire ends of two bundles 11, 12 and of clamping means 13 and 14 spaced from the two ends of the side blocks, each clamping means consisting of two prestressed high grade bolts 18, threaded at one end thereof, which pass through holes in the side blocks 15 and on opposite sides of the bundles of wires 17. The clamping devices 13, 14 have, in this embodiment, a number of common clamping plates 16 extending continuously over the entire length of the side blocks. Between the clamping plates, the ends of the stressing wires 17 of bundle 11 adjacent but somewhat spaced apart from those of bundle 12, as shown are essentially in axial alignment. The wire ends of both bundles are inserted in a manner similar to the arrangement shown in FIGURE 2. By means of the common clamping plates 16 and the side blocks 15, the tensile forces exerted on the wires 17 are transmitted directly from one bundle to the other by means of the common plates 16. In this embodiment, the bundles 11, 12 must not differ substantially in their construction, i.e., in the thickness, cross section, quality and number of the wires 17.

Figure 4:
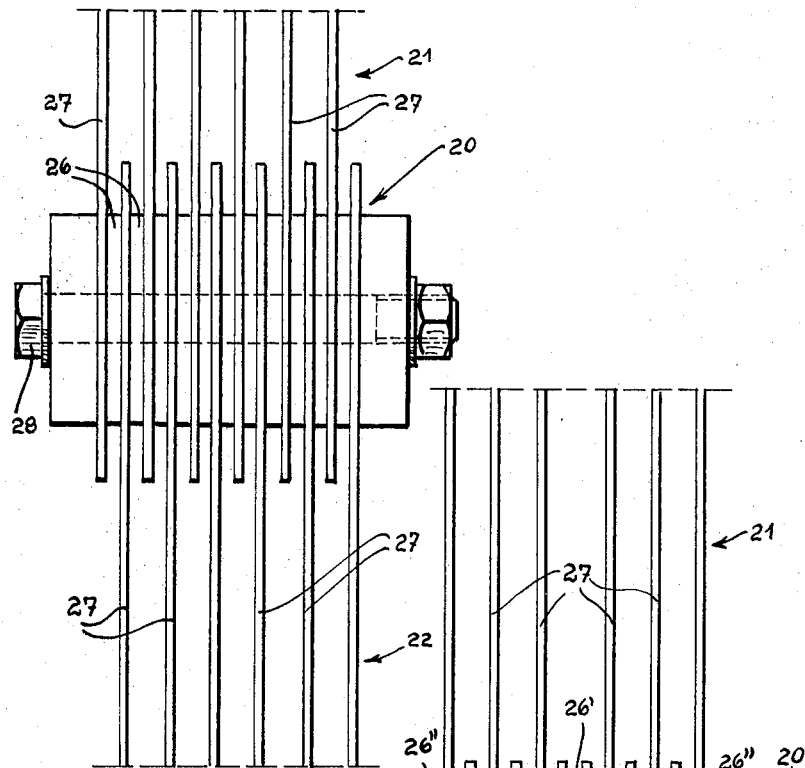

In the embodiment according to FIGURE 4, only one row of high tensile bolts having two threaded bolts 28 is used for the entire coupling device 20. The ends of the two bundles 21, 22 of wires overlap so that at their ends the rows of wires in one bundle 21 alternate with those in the other bundle 22. Clamping plates 26 are interposed between each pair of adjacent rows of wires 27 near the ends thereof. With identical bundles of wires, the axes of the two bundles do not coincide exactly so that upon stressing of the wires a torque will be set up about an axis perpendicular to the length of the bundles and to the axis of the bolts 28.

Figure 5:
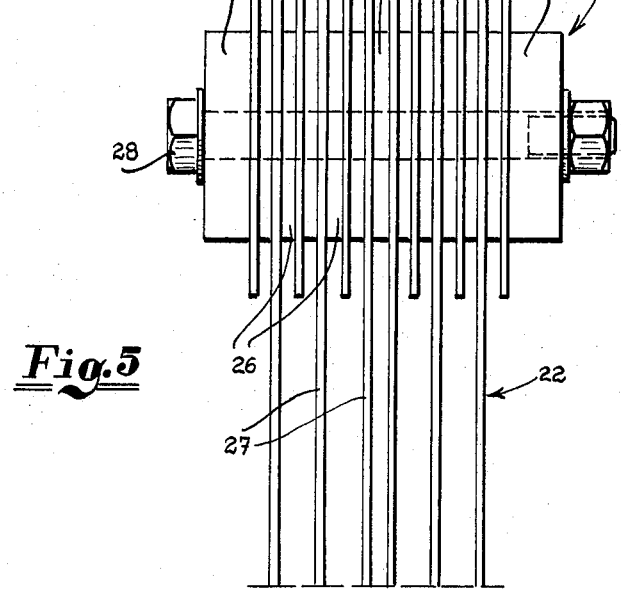

To avoid this, as illustrated in FIGURE 5, the two central rows of wires 27 in one bundle 22 will not have a row of wires from the other bundle 21 between them so that the central clamping plate 26', unlike the others, is acted upon on both sides by forces in the same direction, i.e., in the direction of the far end of the bundle 22. It may, however, transfer these forces to the side blocks 26" by way of the bolts 28. The purpose of elements 20, 21, 26 and 27 is identical with that described for the previous embodiment.

In the embodiment illustrated in FIGURES 6 and 7, the construction shown in FIGURE 5 is modified in that the central clamping plate 36' is made trapezoidal and its sloping edges 36''' bear upon the bolts 38 and force them apart to an extent related to the tension force transmitted by the adjacent rows of wires. Elements 30, 31 and 32 are substantially identical with their respective counterparts 20, 21 and 22 described in connection with FIGURE 5.

Due to this outward spreading of the bolts 38, the assembly formed by the clamping plates 36 and the prestressing wires 37 is drawn together more firmly, whereby the clamping force acting perpendicularly with respect to the prestressing wires 37 is increased.

As shown in the drawing the clamping force for the wire ends of each bundle is obtained by high tensile bolts arranged in a single row perpendicular to the general direction of the wires. The embodiments of FIGURES 1, 2 show two bolts 8 and of FIGURE 3 two bolts 18 positioned in one row for each bundle, while according to FIGURES 4 through 7 one single row of bolts 28 or 38, respectively, is sufficient for both bundles. By the arrangement of bolts as shown the clamping force is applied linearly along the single wires of each bundle and the wires are subjected to gradual application of compressive load. Though two bolts in a row, as shown, are preferred it is also possible to apply the desired clamping force by means of three or more bolts in a single row perpendicular to the wire axis.

It is however important to note that for any desired clamping force the diameter of the high tensile bolts is limited by the demand that the bolts have to be prestressed for elastic elongation. If, f.i., a clamping pressure of 50 tons is to be applied to the block means for tightly clamping the wires between the plates, two bolts having a yield strength of 100 kg./mm.$^2$, and a diameter of 24 mm. may become prestressed, f.i., by hydraulic means, by applying to each bolt a tension force of 25 tons which is about 55% of the yield strength of the bolt, resulting in elastic elongation of the bolt. In case, however, that four bolts of the same high quality are used instead of two, these four bolts must not have the same diameter as that of the aforementioned two bolts but a smaller diameter, in order to obtain the desired clamping force with a sufficient percentage of the yield strength of the bolts, i.e., with sufficient axial elasticity of the bolts for compensating possible variations in the diameter of the stressing wires and in several cases also in the thickness of the clamping plates.

It is to be noted that tension of the stressing wires from one of the bundles is transmitted to the other bundle by transferring tensile forces from the wires to the adjacent plates, so that as a consequence also the thickness of the clamping plates may slightly decrease. Therefore, axial elasticity of the high tensile bolts is provided according to the invention to compensate for any decrease of height of the package made up from stressing wires and clamping plates in case of high tension loads of the wires up to their ultimate load. Even in the embodiment according to FIGURES 1, 2, where the clamping plates 6 are supported for pressure transmission to the connecting blocks 5, a possible increase of plate thickness due to pressure parallel to the major faces of the plates will not amount to the same value as the corresponding decrease of the wire cross section. Different from FIGURES 1, 2, the plates according to the embodiments of FIGURES 3 through 7 are subjected directly to tension forces from wires of both bundles, so that a contraction of the wire cross section is not even partly compensated by an increase of plate thickness. Compensation up to the ultimate load of the stressing wires to be coupled is however obtained according to the invention by providing and maintaining the necessary clamping force by means of adequately prestressed high tensile bolts.

As a result of the clamping force exerted by the high tensile bolts the wires are clamped between the plates, i.e., the wires and the plates are secured to each other by friction forces. Though in the embodiments shown in the drawing (compare, f.i., FIGS. 2 and 7) the high tensile bolts are shown to penetrate the plates as well as the block means it is also possible to position the bolts outside of the plates, with correspondingly larger block means to receive the bolts as the friction forces due to the compressive force exerted by the bolts and block means will maintain the relative position of the clamping plates and the stressing wires. This variant is not illustrated.

As shown in FIGURES 11 and 12 the frictional engagement between the wires and the plates may be improved by providing stressing wires 17 of oblong cross section (FIGURE 12), and positioning the wires between the plates with the major cross section axis parallel to the major faces of the plates (compare also FIGURES 2, 3 and 6, 7).

It is also of advantage for an improved frictional engagement between the clamping plates and the stressing wires to provide rib-like or the like projections on the surfaces of the wires or of the plates. Projections 60 extending angularly to the axis of the wire 17 as shown in FIGURES 11 and 12 are preferred. Alternately, if the clamping plates are provided with projections, these projections may be formed as small ribs perpendicular to the general direction of the wires, as indicated in FIGURES 13 and 14, where a plate portion 16 is shown with ribs 62 extending parallel to a row of holes 63 for receiving high tension bolts.

In FIGURES 8 through 10 and 15 there is illustrated a hydraulic device for prestressing the high tensile bolts of a coupling device according to the invention. The device as shown comprises four cylinder-piston units 40, 42, 44, 46, connected in series as indicated by references *a* through 1, and arranged in two pairs 42, 44 and 40, 46 (see FIG. 10) opposite to and aligned with the free ends of the two high tensile bolts 18 of the one and the other respectively of the two bundles to be coupled.

The hydraulic device is shown as applied to a coupling device according to the embodiment of FIGURE 3, but for simplification of the drawing only four rows of wires 17 are shown instead of the six rows shown in FIGURE 3.

Each hydraulic unit has a piston rod 50 which is connected to the respective bolt 18 as shown in FIGURE 15. A screw nut 51 is secured to the piston rod 50 at the lower end 52 thereof. The nut 51 is also screwed on to the upper threaded end of the high tensile bolt 18. A second screw nut 13', as shown without reference numeral adjacent the arrow 13 in FIGURE 3, is also screwed on to the upper end of bolt 18 between the nut 51 and a pressure transmitting ring plate 54 surrounding bolt 18 on the upper side of block 15.

It will be apparent from the arrangement, as shown and described, that pressurizing of the hydraulic units 40, 42, 44 and 46 for lifting the piston rods 50 will simultaneously tension the high tensile bolts 18, whereby the desired rate of prestressing for all of the bolts is easily obtained by adjusting of the hydraulic pressure. For the above-mentioned bolts of 24 mm. diameter, f.i., a hydraulic pressure of the order of about 2000 at (gauge pressure in atmospheres) may be applicable and suitable, to obtain a desired elastic elongation of the bolts.

As soon as the desired rate of prestressing of the bolts is obtained, the second nut 13' on each bolt is tightened by means of a pin, inserted consecutively in radial borings 55 provided in the nut. The hydraulic pressure in the units is only released when a close physical contact has been obtained between the nut 13', the ring plate 54 and the block 15 respectively. Equal prestressing rates of all four high tensile bolts 18 are thus obtained and are maintained by the nuts 13' after removal of the hydraulic device.

To obtain a reliable coupling it will be sufficient to prestress by tension only the row of bolts of one bundle at a time. However, with few bolts as preferred, f.i., two, in the single row for each bundle (FIG. 3) or for both bundles (FIGS. 4–7) saving of time by prestressing all of the bolts simultaneously is an additional advantage.

Hydraulic units comprising each two coaxial pistons in one cylinder, as indicated in FIGURES 8 and 9 by two feeding zones each receiving connecting lines *a, b, c*, etc., are a preferred embodiment for high pressure application over a limited base, as may be the case when the distance between the bolts of one row is not sufficiently or simultaneous arrangement of cylinders with only one piston of sufficient area.

Devices other than hydraulic means may be used for prestressing the high tensile bolts provided that sufficient tension force and adequate control thereof as to the desired rate of prestress is available.

What is claimed is:

1. An apparatus for coupling stressing wire bundles, comprising, in combination, a first and a second substantially aligned bundle of parallel stressing wires, each bundle including a plurality of substantially parallel rows of wires, the wires of said first bundle being substantially parallel with the wires of said second bundle, and the ends of said wires in the first bundle being adjacent the ends of said wires in the second bundle, first means including a plurality of plane plate portions positioned substantially parallel between said rows of wires so that said wires extend parallel to the major faces of said plate portions, plane block means substantially parallel to the plate portions and outwardly thereof, and second means adjacent said wire ends for exerting compressive forces to said block means in a direction perpendicular to said faces, for clamping said wires between said plate portions and for connecting said first and second bundles for stress transmission between said first and said second bundle, said second means comprising high tensile bolts arranged in a single plane normal to the common direction of the wires in each bundle and prestressed for elastic elongation, whereby decreasing cross section of the wires due to high tensile load is compensated by elastic contraction of said bolts without loss of clamping force.

2. An apparatus according to claim 1, wherein said stressing wires are of oblong cross section with each having its major axis arranged substantially parallel to said major faces of said plate portions and wherein said wires have faces directed toward said faces of said plate portions and forming at said wires a set of faces confronting a set of faces formed by said major faces of said plate portions, said apparatus further including rib-like projections on one of said sets of faces for improved mutual engagement under clamping action.

3. An apparatus according to claim 1, wherein said wire ends in the first bundle are adjacent but spaced from said wire ends in the second bundle, said first means includes a first and a second substantially aligned set of plate portions, each set being positioned between said rows of wires of the respective bundles near said wire ends, and wherein said second means clamp said wires between the plate portions of said first and said second set, further comprising coupling means including a plurality of elongated coupling members connected at their ends to said plate portions for transmitting tensile forces between the plate portions of said first and said second set.

4. An apparatus according to claim 3, further comprising a first and a second retaining member adjacent said wire ends, said members having bearing upon them those edges of said plate portions of the respective first and second set which are farther away from said wire ends, said coupling members being connected at their ends to said retaining members for transmitting tensile forces between said first and said second retaining member.

5. An apparatus according to claim 1, wherein said wire ends in the first bundle are adjacent but spaced from said wire ends in the second bundle, said first means including a plurality of plate portions, positioned with their major faces substantially parallel to said wires and having between them at one of their ends said rows of wires of the first bundle and at the opposite ends thereof said rows of wires of the second bundle, and wherein said second means are positioned adjacent said ends of the plates for clamping said wires between and to said plates at said ends thereof, for interconnecting said first and said second bundles for stress transmission therebetween which is taken up by tensile load applied to said plate portions.

6. An apparatus according to claim 1, wherein said wires of the bundles slightly overlap so that the rows of said first bundle lie between the rows of said second bundle in the region of said wire ends, said first means includes a plurality of plates each disposed between two rows of said wires in said region so that said wires extend parallel to the major faces of said plates, and wherein said second means are positioned adjacent said wire ends for clamping said wires between said plates.

7. An apparatus according to claim 6, wherein the two central rows of said wires are rows of the same bundle.

8. An apparatus according to claim 7, wherein the plate between said two central rows of wires is trapezoidal in shape and its sloping lateral edges bear upon said bolts and force them apart, increasing thereby the clamping forces produced by said bolts.

References Cited by the Examiner

UNITED STATES PATENTS

| | | | |
|---|---|---|---|
| 698,155 | 4/1902 | Thompson | 287—79 |
| 1,603,375 | 10/1926 | Clowes | 287—79 X |
| 1,635,200 | 7/1927 | Zilliox | 287—79 X |
| 2,274,422 | 2/1942 | Mahoney et al. | 174—88.1 X |
| 2,728,978 | 1/1956 | Birkenmaier et al. | 29—452 |
| 2,827,679 | 3/1958 | Blaton | 24—126 |
| 2,866,370 | 12/1958 | Biach | 29—446 X |
| 3,099,109 | 7/1963 | Hahn | 29—452 X |

FOREIGN PATENTS 730,702   5/1955   Great Britain.

CARL W. TOMLIN, Primary Examiner.

THOMAS F. CALLAGHAN, Examiner.